3,082,199
PROCESS FOR THE PURIFICATION OF SOLID POLYOLEFINS OF HIGH MOLECULAR WEIGHT
Theodor Lattenkamp, Oberhausen-Holten, Friedrich Rappen, Oberhausen-Sterkrade, and Heimut Kolling and Nikolaus Geiser, Oberhausen-Holten, Germany, assignors to Ruhrchemie Aktiengesellschaft, Oberhausen-Holten, Germany
No Drawing. Filed Mar. 10, 1959, Ser. No. 798,322
Claims priority, application Germany Mar. 21, 1958
7 Claims. (Cl. 260—94.9)

The invention relates to a purification process for polyolefins of high molecular weight, particularly polyethylene, by removal of ash through a treatment with hydrochloric acid and a combination of solvents.

By a known process, high molecular weight solid polyolefins, particularly polyethylene, are produced by polymerization of gaseous olefins at pressures below approximately 100 kg./cm.$^2$ and at temperatures up to approximately 100° C. This process is operated in the presence of catalysts consisting of mixtures of organometallic compounds, particularly aluminum alkyl compounds, and compounds of metals of subgroups 4 to 6 of the periodic table, particularly titanium compounds. (See "Angewandte Chemie, 67, 541–547 (1955).) The crude polyolefins formed always contain residues of these catalysts which affect the quality of the polymers so that removal of these residues is absolutely necessary.

It has previously been suggested to treat the crude polymer simultaneously with hydrogen chloride and alcohols having concentrations in excess of 50%, preferably after separating from the polymer the inert organic suspending liquid serving as a reaction medium in the polymerization. After subsequent neutralization of the polymer by washing, a pure final product having ash contents of 0.01% by weight and less is obtained.

According to another process, the polymerization products are treated with hydrogen chloride and anhydrous and alcohol-free liquids and subsequently neutralized by washing. Those aliphatic hydrocarbons used as the reaction medium in the polymerization have been found to be particularly useful for this mode of operation.

Although both of the processes give finished products with ash contents of about 0.01% by weight, certain disadvantages are connected with them. Thus, it has been found that the removal of ash with hydrogen chloride and water-soluble alcohols will result in particularly low ash contents and pure white films if the concentration of the alcohol used for de-ashing is as close to 100% as is possible. Upon completion of the ash removal, the polymer is filtered off from the alcohol. The filtrate may then be re-used for treating further polymers.

The washing filtrate obtained in the subsequent neutralization of the filter residue which may be effected with water or with alcohols contains hydrogen chloride and ash constituents. In precipitating these ash constituents and neutralizing the washing filtrate, water is formed. The water-containing alcohols can quite easily be recovered from this mixture in a known manner by azeotropic distillation and used again for washing the filter residue neutral. However, with water-soluble alcohols except ethyl alcohol, the recovery of these alcohols in a still more concentrated form as required for the de-ashing itself requires tedious and costly procedures making the economy of the process questionable. When using ethyl alcohol for the removal of ash, the amount of hydrogen chloride required is so high that high cost ensues from the consumption of alcohol due to the formation of ethyl chloride. If higher boiling water-insoluble alcohols are used, the formation of alkyl chlorides due to the higher molecular weights becomes sufficiently high as to make the process likewise uneconomical.

These disadvantages are avoided in the process of de-ashing polyolefins with hydrogen chloride and alcohol-free and water-free organic liquids. Here, no difficulties are encountered in recovering the solvent and no losses occur due to formation of alkyl chloride. Unfortunately, however, it appears that purification of polymers high in ash content by this process will not always result in end products having the low ash contents desired, i.e. 0.01% by weight and less. While the process is successfully applicable in most cases where products having normal initial ash contents are involved, it fails in the case of starting products which are very high in ash.

It is an object of the present invention to provide a very effective, simple and economical process for removing ash from polyolefins, particularly polyethylene, produced by polymerization at pressures below approximately 100 kg./cm.$^2$ and at temperatures up to approximately 100° C. in the presence of catalysts consisting of mixtures of organometallic compounds, particularly aluminum alkyl compounds, and compounds of metals of subgroups 4 to 6 of the periodic table. This process comprises treating the polymers to be purified, after having separated therefrom the bulk of the reaction medium used in the polymerization, with hydrogen chloride and mixtures consisting of alcohols having preferably concentrations in excess of 95% and water-free and alcohol-free organic liquids, particularly hydrocarbons, at temperatures below 100° C., removing the liquid mixture used for de-ashing by filtration, washing the polymers neutral and drying them.

It has surprisingly been found that, in contrast to the use of hydrogen chloride with one of the two components alone, the removal of ash with hydrogen chloride and mixtures consisting of water-free and alcohol-free organic liquids and alcohols is of a synergistic nature. This becomes evident particularly from the fact that much lower quantities of hydrogen chloride are required in the process according to the invention. Thus, for example, for purifying a given starting product with hydrogen chloride and ethyl alcohol, a content of hydrogen chloride in the mixture of at least 5% is required for obtaining ash contents below 0.01% by weight. When using hydrogen chloride and hydrocarbons for ash removal, a still larger quantity of hydrogen chloride must be passed through the mixture. In contrast to this, a content of less than 0.5% of hydrogen chloride in the liquid mixture used for de-ashing suffices in the process according to the invention. Therefore, the losses caused by formation of alkyl chloride and the cost for the hydrogen chloride itself are decidedly lower.

In contrast to the de-ashing process using hydrogen chloride and alcohol-free organic liquids, the process according to the invention results in extremely low ash contents always ranging below 0.01% by weight, even with starting products which are very high in ash. It could not be foreseen that mixtures of alcohols and alcohol-free organic liquids, particularly mixtures of alcohols and hydrocarbons, have so much higher an efficiency as compared with the individual components alone.

Further advantages are obtained in the recovery of the liquid mixture used for removing ash from the polymers. The filtrate obtained in the filtration of the de-ashed polyolefin can immediately be used again for the purification of new polyolefins, i.e., it can be recirculated into the process cycle of ash removal. The de-ashing liquid remaining in the filter residue is washed out in the subsequent washing of this residue, preferably with water-soluble alcohols, and thus passed over into the washing filtrate from which the organic water-free liquid, e.g. the hydrocarbon fraction, is readily separated after precipitation of the ash constituents. Neutralization of the hydrogen chloride is effected, for example, with aqueous alkaline solutions. The recovery of the alcohol in a concentration in excess of 95% may be dispensed with in most cases when using water-soluble alcohols for the removal of ash since the quantity of this alcohol which remains in the filter residue and passes over into the washing filtrate is so small that these alcohols are recovered in a low concentration, obtained as an azeotropically boiling mixture, and are used for making up the losses of alcohol in the cycle of the washing liquid. On the other hand, it is also possible to carry out the process according to the invention very successfully and, due to the extremely low amount of hydrogen chloride, very economically with mixtures of alcohol-free organic liquids and ethyl alcohol. In this case, no difficulties are encountered in recovering the ethyl alcohol in a 96% concentration.

The preferred water- and alcohol-free organic liquids include aliphatic, cycloaliphatic or aromatic hydrocarbons, which may, for example, be the same as those used as a reaction medium in the polymerization. Chlorinated hydrocarbons, ethers, nitrohydrocarbons or mixtures of these compounds may also be used.

Suitable alcohols include water-soluble and water-insoluble alcohols, it being possible to use aliphatic, cycloaliphatic or aromatic alcohols. Besides monohydric alcohols, dihydric or polyhydric alcohols are suited.

It is advantageous to use aliphatic alcohols having up to 4 carbon atoms because the boiling point of the alkyl chlorides formed from hydrogen chloride and these alcohols is so low that they are easily removed from the de-ashing liquid and the washing liquid, e.g. by blowing out with inert gases. Moreover, the quantity of alcohol lost through the formation of esters, due to its relatively low molecular weight, is low as compared with alcohols having higher molecular weights and, therefore, entails lower cost.

Particularly advantageous is the use of ethyl alcohol because this alcohol, as mentioned above, can be recovered from the washing filtrate in a 96% concentration in a very simple manner.

The proportions of alcohol-free organic liquid and alcohol in the mixture may be varied within comparatively wide limits. In general, however, the proportion of the alcohol-free organic liquid will be chosen substantially higher than that of the alcohol, e.g. more than 70% of alcohol-free organic liquid in the mixture.

The process according to the invention can be carried out by quite different methods. The treatment may be effected continuously or batchwise using vessels with stirrer, recirculating devices, tubular coils, washing screws or other suitable apparatus. The temperatures used in the treatment range between about 40 and 100° C., the preferred range being between 60 and 80° C. The reaction periods generally are between 1 and 4 hours. The quantity of the solvent used is chiefly dependent upon the type of equipment used. In general, 5 to 10 times the quantity of solvent, based on polyolefin to be treated, is used.

The quantity of hydrogen chloride may vary. In most cases, less than 0.5% of hydrogen chloride in the liquid used for de-ashing suffice for the process. Such low quantities of hydrogen chloride have the advantage that the quantity of alcohol consumed through formation of alkyl chloride is maintained at a very low level. On the other hand, the effect of the added hydrogen chloride is decisive for the success of the process. As may be seen from the examples given below, a considerably poorer effect with respect to ash removal is obtained when operating without the addition of hydrogen chloride. This is especially true also with respect to the removal of small amounts of iron which are generally present in polymerizations carried out on a commercial scale and which adversely affect the color of the end product and the articles produced therefrom.

A particularly advantageous method of continuous de-ashing is to use several series-connected vertical reaction vessels of comparatively great height equipped with a cylindrical body serving as an agitator, extending throughout the length of the vessel, rotating at a sufficiently high speed in the axis of the reaction vessel and leaving only a comparatively small distance between its surface and the inner cylinder wall. This type of agitation effects intimate intermixing of the reactants in horizontal direction while practically completely avoiding intermixing in vertical direction, which is essential for the complete removal of ash. The mixture to be treated of polymer and hydrogen chloride-containing de-ashing liquid is passed through these vessels in concurrent flow relation in downward or upward direction. If the alcohol-free organic liquid and the alcohol used will not mix completely with each other, the polymer with the alcohol-free organic liquid, on the one hand, and the alcohol, on the other, may be passed in countercurrent, i.e., the former mixture in upward direction and the alcohol downwardly.

The effluent mixture from the last reaction vessel is passed to a filter device, e.g. a drum filter, where it is separated into a filter residue and a filtrate. The filtrate may be returned to the first reaction vessel and used again and again for de-ashing new polymer with the same success, after replenishing the losses left in the filter residue and adjusting the hydrogen chloride content to the required level.

The filter residue subsequently is neutralized and freed from ash on the filter device by washing. This may be effected with a solvent which is the same as or different from that used in the preceding de-ashing operation. Temperatures up to approximately 100° C. may be used in this step. If desired, water may be used as the washing liquid, the use of water-soluble alcohols, e.g., of ethyl or propyl alcohol being particularly advantageous.

Recovery of the washing liquid may be effected by various methods known per se. Thus, for example, the washing filtrate may be neutralized with aqueous alkaline solutions, e.g., an aqueous caustic potash solution, thereby precipitating the dissolved catalyst constituents which may be filtered off. Then the water-free organic solvent, e.g. the hydrocarbon fraction, is separated and, finally, the washing alcohol is recovered as a water-alcohol azeotrope by distillation.

The filter residue must be freed from the residual amount of solvent after completion of the washing. This may be effected by a treatment with steam and subsequent drying. However, an advantageous method of removing the residual quantity of the solvent is by means of a heated drying tube known as "helical flash drier" operated in an atmosphere of ethylene or inert gas and with utilization of the centrifugal force.

The products which are treated by the process according to the invention are polymers from which the bulk of the reaction medium used in the polymerization has been separated by filtration in the absence of air and moisture, e.g. in a centrifuge. The solvent which still adheres to the polyolefin may be fed, together with the polymer, into the de-ashing process, especially if the same solvent is used for this process.

It is, however, substantially more advantageous to separate this residual quantity of solvent before the de-ashing process, e.g., by driving off in helical flash driers in the presence of inert gases. As an alternative, the residual solvent may be removed by a treatment with steam or a mixture of steam and a caustic solution and subsequent drying. Although, in this treatment, the metal salts from the catalyst mixture are converted into the sparingly soluble oxide form, it surprisingly is possible by the process according to the invention to remove these metal salts except for ash contents below 0.01% by weight.

The separation of the reaction medium used in the polymerization from the polymer before the de-ashing operation has the great advantage that the hydrocarbon fractions generally used as the reaction medium in the polymerization can be recovered without contamination by the alcohols used for the removal of ash from the polymers. After having driven off these hydrocarbons by steam distillation, it suffices in most cases to subject them to a simple drying step prior to re-use in the polymerization, while otherwise tedious efforts will have to be made to quantitatively remove the alcohol contained in these hydrocarbons due to the de-ashing operation since, as is known, even traces of oxygen-containing compounds, seriously interfere with the polymerization. It is only by the de-ashing process according to the invention that this advantage can be obtained. Polymers whose ash constituents have been altered by processes which, similar to the process of the invention, operate only with alcohols or with mixtures of hydrocarbons and alcohols but without the addition of hydrogen chloride, have considerably higher residual ash contents.

In contrast thereto, the process according to the present invention yields end products having ash contents below 0.01 percent independently of the pretreatment of the polymers, even with high initial ash contents as occur at times when the polymerization shows poor yields.

The polymers obtained according to the present invention give pure white films.

The invention now will be more fully explained by means of the following examples. However, it should be understood that these are given merely by way of illustration, not of limitation, and that numerous changes may be made in the details without departing from the spirit and scope of the invention as hereinafter claimed.

*Example 1*

Ethylene was polymerized in a hydrogenated and thoroughly dehydrated aliphatic $C_9$-$C_{11}$ hydrocarbon fraction derived from the Fischer-Tropsch synthesis and in the presence of a catalyst consisting of 1 mol titanium tetrachloride and 1.5 mols diethyl aluminum monochloride at a temperature of about 75° C. The bulk of the hydrocarbon fraction used as the polymerization medium was separated from the reaction product by means of a centrifuge which was protected from access of air and moisture.

One part of the filter residue which contained approximately equal parts of polyethylene and solvent was treated for 2 hours at 80° C. in a vessel with stirrer with 4.5 parts of a mixture consisting of 85 parts of the $C_9$-$C_{11}$ hydrocarbon fraction used as the polymerization medium and 15 parts of a 99.8% isopropyl alcohol and having a hydrogen chloride concentration of 0.4%. The polymer was separated by filtration, neutralized by washing with isopropyl alcohol and dried. The end product had an ash content of 0.005% by weight.

When de-ashing the polymer in a comparative test using the procedure described above with the same hydrocarbon-alcohol mixture but without the addition of hydrogen chloride, an end product having an ash content of 0.085% by weight was obtained.

*Example 2*

Ethylene was polymerized at about 75° C. in the same hydrocarbon fraction as used in Example 1 but with the use of a catalyst consisting of 1 mol titanium tetrachloride and 2 mols triethyl aluminum. The bulk of the hydrocarbon fraction was separated from the reaction product by filtration. The residual amount of the hydrocarbon fraction was then removed by means of a preheated nitrogen stream in a drying tube externally heated at approximately 100° C. There was obtained a polyethylene powder having an ash content of 0.14% by weight.

One part of this product was treated for 2 hours at 80° C. in a vessel with stirrer with 8 parts of a mixture consisting of 80 parts of xylene and 20 parts of a 99.7% butyl alcohol and containing 0.4% of hydrogen chloride. After this time, the polymer was separated by filtration, neutralized by washing with butyl alcohol and dried. The product had an ash content of 0.003% by weight.

When de-ashing the polymer by the same procedure with the same mixture of xylene and butyl alcohol but without the addition of hydrogen chloride, a product with an ash content of 0.093% was obtained.

*Example 3*

Ethylene was polymerized in the same hydrocarbon fraction as used in Example 1 but in the presence of a catalyst consisting of a mixture of 1 mol titanium tetrachloride and 1.2 mols diisobutyl aluminum monochloride. The bulk of the hydrocarbon fraction was separated from the polymerization product by filtration and the balance was removed by means of a drying tube in the manner described in Example 2. A polyethylene powder having an ash content of 0.18% by weight was obtained.

One part of this product was placed into a vessel with stirrer and treated for 2 hours at 75° C. with 10 parts of a mixture consisting of 75 parts of toluene and 25 parts of 96% ethyl alcohol and containing 0.3% of hydrogen chloride. The polymer was separated by filtration, neutralized by washing with ethyl alcohol and dried. The end product had an ash content of 0.006%.

When de-ashing the product by the procedure described in the preceding paragraph with the same mixture of toluene and ethyl alcohol but without the addition of hydrogen chloride, an end product having an ash content of 0.11% by weight was obtained.

When removing the ash with a 96% ethyl alcohol with no addition of toluene and operating under otherwise identical conditions, the ash content of the end product was 0.08% by weight when adding 0.3% of hydrogen chloride and 0.008% by weight when adding 5% of hydrogen chloride. Finally, when carrying out the ash removal with pure toluene without the addition of ethyl alcohol and while introducing sufficient hydrogen chloride that an excess of hydrogen chloride left the vessel, a product having an ash content of 0.024% by weight was obtained after a treating period of 3 hours, washing to neutrality with toluene, filtration and subsequent drying.

We claim as our invention:

1. A process for reducing the ash content of polyethylene to less than 0.01%, said polyethylene having been produced by the polymerization of ethylene in a diluent at pressures below approximately 100 kg./cm.$^2$ and at temperatures up to approximately 100° C. with catalysts consisting of mixtures of aluminum alkyl compounds with titanium compounds, which comprises substantially separating said polyethylene from said diluent, treating it with a solvent mixture containing from about 0.3 to about 0.5 percent of hydrogen chloride, said solvent mixture consisting of an alcohol present in an amount not greater than 30 parts and having a concentration above 95%, and at least about 70 parts of a hydrocarbon, at temperatures below 100° C., separating said polyethylene therefrom, washing it to neutrality, and drying it.

2. The process according to claim 1, wherein the alcohol in said solvent mixture is a water-soluble, monohydric, aliphatic, alcohol.

3. The process according to claim 2, wherein said alcohol is selected from the group consisting of ethanol, propanol, and butanol.

4. The process according to claim 1, wherein washing to neutrality is carried out with water-soluble alcohols.

5. The process according to claim 1, in which said polyethylene is freed completely from said diluent prior to the treatment with hydrogen chloride in the solvent mixture.

6. A process for reducing the ash content of polyethylene to less than 0.01 percent, said polyethylene having been produced by the polymerization of ethylene in a diluent at pressures below approximately 100 kg./cm.$^2$ and at temperatures up to approximately 100° C. with catalysts consisting of mixtures of aluminum alkyl compounds with titanium compounds, which comprises separating said polyethylene from said diluent, treating it with a solvent mixture containing 0.3 to 0.5 percent hydrogen chloride, said solvent mixture consisting of 15 to 25 parts of an alcohol having a concentration above 95 percent and 75 to 85 parts of a hydrocarbon, at temperatures below 100° C., separating said polyethylene therefrom, washing it to neutrality, and drying it.

7. A process for reducing the ash content of polyethylene to less than 0.01 percent, said polyethylene having been produced by the polymerization of ethylene in a diluent at pressures below approximately 100 kg./cm.$^2$ and at temperatures up to approximately 100° C. with catalysts consisting of mixtures of aluminum alkyl compounds with titanium compounds, which comprises completely freeing said polyethylene from said diluent by treating it with steam in the presence of alkaline agents and drying it, treating it with a solvent mixture containing 0.3 to 0.5 percent hydrogen chloride, said solvent mixture consisting of 15 to 25 parts of an alcohol, selected from the group consisting of ethanol, propanol and butanol, having a concentration above 95 percent, and 75 to 85 parts of a hydrocarbon, at temperatures below 100° C., washing said polyethylene to neutrality with a water-soluble alcohol, and drying it.

References Cited in the file of this patent

UNITED STATES PATENTS

| | | |
|---|---|---|
| 2,827,446 | Breslow | Mar. 18, 1958 |
| 2,838,477 | Roelen et al. | June 10, 1958 |
| 2,867,612 | Pieper et al. | Jan. 6, 1959 |
| 2,919,267 | Juveland et al. | Dec. 29, 1959 |
| 2,928,818 | Carter et al. | Mar. 15, 1960 |
| 2,962,488 | Horne | Nov. 29, 1960 |

FOREIGN PATENTS

| | | |
|---|---|---|
| 1,139,806 | France | Feb. 18, 1957 |
| 533,362 | Belgium | May 16, 1955 |